(12) United States Patent
Smithwick

(10) Patent No.: US 8,857,994 B2
(45) Date of Patent: *Oct. 14, 2014

(54) TRANSPARENT DISPLAY WITH DYNAMIC MASK

(71) Applicant: Disney Enterprises, Inc., Burbank, CA (US)

(72) Inventor: Quinn Smithwick, Pasadena, CA (US)

(73) Assignee: Disney Enterprises, Inc., Burbank, CA (US)

( * ) Notice: Subject to any disclaimer, the term of this patent is extended or adjusted under 35 U.S.C. 154(b) by 206 days.

This patent is subject to a terminal disclaimer.

(21) Appl. No.: 13/663,865

(22) Filed: Oct. 30, 2012

(65) Prior Publication Data

US 2014/0118336 A1    May 1, 2014

(51) Int. Cl.
*G03B 21/00* (2006.01)

(52) U.S. Cl.
USPC .......... 353/7; 353/15; 353/28; 353/30; 345/4; 345/6; 345/87

(58) Field of Classification Search
USPC .......... 353/7, 28, 30; 359/462, 463, 464, 466, 359/468, 475, 478; 345/4, 6, 87, 102, 204, 345/462
See application file for complete search history.

(56) References Cited

U.S. PATENT DOCUMENTS

| | | | | |
|---|---|---|---|---|
| 6,481,851 B1 * | 11/2002 | McNelley et al. | ............. | 353/28 |
| 7,226,167 B2 * | 6/2007 | Cobb | ................. | 353/7 |
| 7,342,721 B2 * | 3/2008 | Lukyanitsa | .................. | 359/462 |
| 7,446,733 B1 * | 11/2008 | Hirimai | ........................ | 345/32 |
| 2009/0168027 A1 * | 7/2009 | Dunn et al. | .................... | 353/28 |
| 2013/0300728 A1 | 11/2013 | Reichow | | |

* cited by examiner

*Primary Examiner* — Sultan Chowdhury
(74) *Attorney, Agent, or Firm* — Marsh Fischmann & Breyfogle LLP; Kent A. Lembke

(57) ABSTRACT

A transparent display with a dynamic mask for generating three dimensional (3D) imagery. The display or apparatus includes a display element that is transmissive and that is selectively operable to display an image on the display element. The apparatus includes a dynamic mask element that is transmissive to light and that is positioned adjacent to the display element. The dynamic mask element is selectively operable to provide a mask with a shape and a size corresponding to the displayed image. The mask is positioned on the dynamic mask element so as to be adjacent to the first location, e.g., to be behind the displayed image, and, typically, the mask includes portions that are semi-transparent or opaque to block light from passing from the background through the displayed image and from passing through the display element at the location of the displayed image into the background to avoid double imaging.

23 Claims, 5 Drawing Sheets

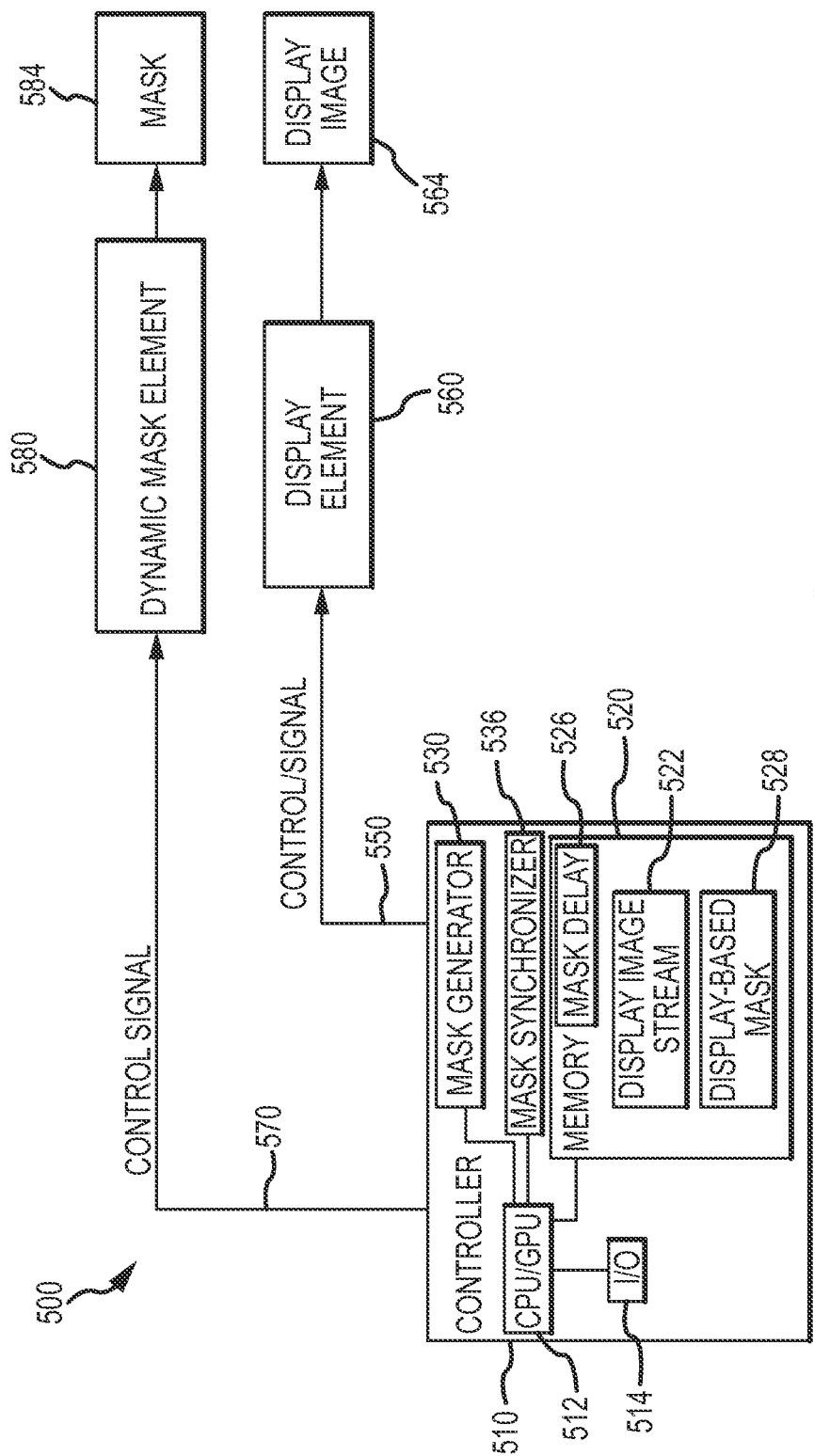

TRANSPARENT DISPLAY WITH DYNAMIC MASK

BACKGROUND

1. Field of the Description

The present description relates, in general, to three dimensional (3D) or volumetric displays adapted to provide the illusion that a virtual or projected image is a 3D image or has volume. More particularly, the description relates to systems and methods involving a transparent display with a dynamic mask to produce sharp 3D volumetric images or objects without requiring viewers to wear 3D glasses or the like and without (or with reduced) blow-by being transmitted through the scrim onto background props and surfaces.

2. Relevant Background

There is a growing trend toward using 3D projection techniques in theatres and amusement parks and in home entertainment systems including video games and computer-based displays. In many conventional 3D projection techniques, the right eye and the left eye images are delivered separately to display the same scene or images from separate perspectives so that a viewer sees a three dimensional composite, e.g., certain characters or objects appear nearer than the screen and other appear farther away than the screen. However, stereoscopy, stereoscopic imaging, 3D imaging, and 3D or volumetric displays are labels for any technique capable of creating the illusion of depth in an image.

Often, the illusion of depth in a photograph, movie, or other two-dimensional image is created by presenting a slightly different image to each eye or the creation of parallax. In most animated 3D projection systems, depth perception in the brain is achieved by providing two different images to the viewer's eyes representing two perspectives of the same object with a minor deviation similar to the perspectives that both eyes naturally receive in binocular vision.

There is a continuous desire and need to provide new techniques that provide cost effective but eye-catching content with depth and dimension. For example, it is desirable to grab the attention of crowds in shopping malls, on busy streets, in amusement parks, and other crowded facilities such as airports and entertainment arenas. As discussed above, 3D imagery and volumetric displays are exciting ways to appeal to viewers and hold their attention. However, the use of 3D imagery has, in the past, been limited by a number of issues. Typically, 3D projection technologies require the viewer to wear special viewing glasses. This is often inconvenient for many applications and can significantly add to costs to provide the 3D media for projection and also for the special eyewear that has to be provided to the viewer.

Some attempts have been made in providing volumetric displays without the need for eyewear, but each has its own limitations. For example, displays providing a scrim projection or traditional Pepper's Ghost illusion are common tools used throughout amusement parks and other settings. These displays allow placement of a virtual character or object (i.e., a ghost, a video of a character, or the like) within a real world scene. A scrim projection is usually accomplished by using a projection onto a scrim (e.g., an open weave material appearing transparent when lit from behind but providing a projection surface when lit from the front or viewer's side) while a Pepper's Ghost is a reflection of a display in a beam splitter. Unlike directly viewing an opaque monitor, the scrim and the beam splitter are partially transparent to the viewer (even when lit from the front) so the displayed character is not framed by the display. The virtual character can be placed relatively seamlessly behind real world objects or props (foreground elements) and in front of real world objects or props (background surfaces and elements).

Unfortunately, the partial transparency of the scrim or the beam splitter also leads to the virtual character having low contrast and being semi-transparent. This can lead to a brightly lit background surface or prop being seen through the character/object displayed on the scrim or the beam splitter, and this is especially problematic in portions of the displayed character/object that should appear dark and/or solid. The character's darkest dark portion is defined by the background (i.e., only as dark as the background surfaces/props provided behind the displayed character/object).

FIG. 1 illustrates a traditional scrim-based 3D display 100 during its operation to provide a volumetric illusion. As shown, the display 100 includes a physical frame 110 supporting a scrim 120. A foreground platform 130 is shown to extend outward from the frame 110 toward a viewer (not shown) or into the viewing space, which provides additional volume to the display 100. The display 100 includes a backdrop or background set (e.g., a projection surface) 140 as well as physical or real world background objects or props 141, 142 (e.g., 3D objects) between the backdrop 140 and the rear surface of the scrim 120. As shown, operation includes lighting the backdrop 140 (e.g., projecting still or video images onto a projection screen) and also lighting the background props 141, 142 (e.g., with background lighting (not shown) provided behind the frame 110 and scrim 120).

Concurrently, virtual characters 150, 152 are displayed by projecting light from a projector (not shown) onto the front surface or viewer side of the scrim 120. The virtual characters 150, 152 appear to be physically positioned between the foreground props 130 and the background props 141, 142 and backdrop 140. As shown, though, the virtual characters 150, 152 are translucent, which allows lit objects behind the scrim 120 and characters 150, 152 to be seen through the displayed characters (e.g., portions of background props 141, 142 are seen through characters 150, 152). This is undesirable as it ruins the illusion that the characters 150, 152 are solid or real objects. As will be appreciated, projection onto scrims also will not allow the virtual characters to cast a true shadow. For example, the displayed characters 150, 152 in the display 100 do not cast shadows on the background props 141, 142 or onto backdrop/surface 140 as would be expected if the characters 150, 152 were real or physical objects in a scene.

Projection onto scrims also suffers from projector spill onto backgrounds or blow-by. Since a scrim is configured with an open weave to appear transparent or go unnoticed by viewers in areas where it is not projected on and when it is not in use to show virtual characters, significant amounts of projected light pass through the scrim from the foreground space into the background space. As a result, the projected character not only appears on the scrim but also as a double image on background props and surfaces. Hence, the semi-transparency, low-contrast, and lack of shadow aspects of scrim-based displays can spoil the illusion of a solid virtual character integrated into the scene. Projector spill and the need to position the virtual character against a darker portion of the background space limits the character, animation, and set design. Although the use of a beam splitter in a Pepper's Ghost illusion does not suffer from image spilling onto the background, the beam splitter being angled at 45 degrees to the viewer makes the display assembly quite bulky, which has led to it only being used in settings where space is not a significant limitation.

Some attempts have been made to try to address these problems associated with the use of scrims in 3D displays, but these have not been wholly satisfactory to display designers.

For example, one typical approach for addressing the fact that the displayed character on the scrim appears semi-transparent has been to choose characters and images for projection on the scrim made up of very bright and light colors and to avoid darker colors. The bright light from the projected character is used to try to overwhelm the background light. However, this leads to a low contrast and an "over-exposed" appearance of the displayed character on the scrim, and it also severely limits character design in such 3D displays.

Another approach, which may be used in conjunction with the above approach, is to make the background very dark in color and with low lighting levels. This approach is used to try to reduce the background bleeding through or being visible through character or other images being displayed on the scrim. Unfortunately, such an approach leads to constrained, dark, and uninteresting backgrounds for scrim-based displays and significantly limits set design (e.g., eliminates many desirable background props and lighting effects in the background space). In other cases, the display is designed such that the background surfaces and/or background props are positioned so as to be relatively far away from the scrim or the projection is angled steeply. This acts to limit blow-by of light as the projector spill tends to land in portions of the background space that cannot be seen by the audience or viewers through the scrim, but, of course, this also limits display or set design and is only useful when the display can be quite large (i.e., not compact).

Due to the shortcomings of such scrim-based displays and Pepper's Ghost displays with beam splitters, there remains a need for systems and methods for providing 3D or volumetric displays such as Pepper's Ghost displays or illusions without the need for special eye or head wear. Preferably, the systems and methods would provide a transparent or 3D display that can be designed to be more compact while also addressing content semi-transparency, low contrast, and blow-by problems associated with traditional scrim-based displays and Pepper's Ghost displays.

SUMMARY

To address the above and other problems, an apparatus ("a 3D display assembly" or "a transparent display with a dynamic mask" or other labels as used herein) is provided for generating 3D illusions or displays in which a projected virtual character has high contrast and low or no translucence and also casts a shadow. A transparent display with a dynamic mask system using a scrim (or "a scrim with a LCD dynamic mask") modifies and improves upon a traditional scrim-based display with its projector, scrim, and background assembly (projection surfaces/screens and props) by inserting a dynamic mask element or apparatus between the scrim and the background assembly (or in the background assembly). The dynamic mask element may be positioned directly behind the scrim's back surface and even in contact with this surface to provide a compact and space saving arrangement of the components.

In some embodiments, the dynamic mask element includes a transparent liquid crystal display (LCD) panel. In operation, the scrim scatters a portion of the light projected onto its front surface with the projector back towards the audience or into the foreground and/or viewer space, and this allows the displayed images/objects such as virtual characters to be seen by someone viewing the scrim with a LCD dynamic mask system. The dynamic mask element is controlled or operated to present one or more masks or mask areas and concurrently to provide transparent portions ("unmasked areas").

The unmasked areas or transparent portions of the, for example, LCD panel let the background surfaces and props to be seen through the scrim around the character(s) that is being displayed on the scrim, as the background is lit using one or more light sources provided in the background assembly and the reflected or scattered light is transmitted through the LCD panel and the scrim to the foreground or viewer space. The masked areas may be opaque or semi-transparent to transparent (colored or the like to provide a desired effect or to allow some light to pass through a masked character/object), and the masked areas are positioned on or mapped to the locations of the displayed character or object to which they are paired (which displayed character/object they are masking) so as to be provided in the LCD panel directly behind the displayed character on the scrim. The masked areas typically will have the same size and shape as the object/character they are masking. In other words, the opaque (or semi-transparent to transparent) areas or portions of the LCD panel act as a dynamic mask for the scrim and may be in the shape and size of the displayed characters/objects as presented on the scrim.

The dynamic mask provided via operation of the LCD panel (or dynamic mask element) prevents (when opaque or black) the background surfaces and props (or "set") from being seen through the masked character/object displayed on the scrim, which makes the virtual character/object appear to be solid. The LCD-provided mask provides a dark silhouette making the virtual character/object high contrast. The character's/object's darks (or darker portions/areas) appear nearly black and independent from the background.

The dynamic mask also absorbs the projector spill that is passing through the scrim's open weave, thereby preventing this spill or blow-by from lighting the background set so as to eliminate problems with double images of the displayed character/object in the scrim with a dynamic mask system. The dynamic mask also casts true shadows in the shape of the character's/object's silhouette as some light in the foreground space is blocked from entering the background space while this foreground space lighting (light from luminaries and the like positioned in the foreground or viewer space) is allowed to pass through adjacent transparent portions (unmasked portions) of the LCD panel. These shadows in the background space are correct and match shadows that would be cast if solid or physical characters were positioned where the virtual characters are displayed on the scrim. In practice, the "solid" virtual characters/objects displayed on the scrim are viewable from a wide angle by many viewers without the need for special 3D eyewear.

The compact Pepper's Ghost system exhibits mutual occlusion with real props. The solid virtual character/object occludes background props and real props (or "foreground props") placed in front of the dynamic mask element and the scrim occludes the virtual character/object. Of course, real or physical props placed in front of the scrim may block projection onto the scrim, but this blockage can be ameliorated by using two or more projectors to provide the projected/displayed characters/objects on the scrim from two or more different projection angles to ensure fuller coverage of the scrim.

More particularly, an apparatus is provided for generating three dimensional (3D) or volumetric imagery. The apparatus (e.g., a scrim with a dynamic LCD mask system or assembly) includes a display element that is transmissive to light and that is also selectively operable to display an image at a first location on the display element. For example, the display element may include a self-emissive display such as at least one of a transparent OLED display, a display providing a laser projection on a phosphor screen, a fluorescent electrowetting display, or other self-emissive display device.

The apparatus further includes a dynamic mask element that is transmissive to light and that is positioned adjacent to the display element. The dynamic mask element is selectively operable to provide (concurrently with the operating of the display element to provide the displayed image) a mask with a shape and a size corresponding to the displayed image. The mask is positioned on the dynamic mask element so as to be adjacent to the first location (e.g., to be behind the displayed image), and, typically, the mask includes portions that are semi-transparent or are opaque so as to block light from passing from the background through the displayed image and from passing through the display element at the location of the displayed image into the background (to avoid double imaging and/or blow-by).

In some embodiments, the apparatus also includes a background space (or background assembly or set) containing background props and a light source lighting the background props. In such embodiments, the apparatus may further include a foreground space (or foreground assembly or set) containing foreground props and light sources. Then, the display element and the dynamic mask element can be positioned between the foreground and background spaces, and the lighting of the background props is occluded from view in the foreground space by the mask and the lighting used with the foreground props is occluded by the mask to cast shadows in the background space.

In some implementations of the apparatus, the dynamic mask element includes a transparent liquid crystal display (LCD) panel, and, in other implementations of the apparatus, the dynamic mask element could be an absorbing display such as an electrowetting display. The mask portions that are semi-transparent are gray and the mask portions that are opaque are black. In the same or other implementations of the apparatus, the display element includes a scrim with a back surface contacting the dynamic mask element and a front surface opposite the back surface. Then, the display element includes a projector that projects light onto the front surface to provide the displayed image. However, in other implementations, the display element includes a self-emissive display such as an OLED display with a back surface proximate to the dynamic mask element. In these implementations, the OLED is operated to provide transparent portions and to concurrently provide color portions associated with the displayed image.

In some cases, the display element is operable to display a second image at a second location on the display element and, in response, the dynamic mask element is concurrently operable with the display element to provide a second mask with a shape and a size corresponding to the displayed second image. Typically, the second mask is semi-transparent or opaque and is located adjacent to the second location on the dynamic mask element (e.g., is mapped in size, shape, and location to the displayed image, which may change over time such when it is animated or is a video stream or clip). In these or other cases, the mask may include portions that are transparent to semi-transparent and portions that are opaque. In this manner, light passing through the display element in an area associated with the displayed image is both transmitted through and also blocked by the dynamic mask element.

In some cases, the apparatus is configured for compensating for frame delay between the transparent display and the mask. Often one or both of the transparent display and the mask display perform image processing on the input imagery. This can cause a time delay between input and display which may be different between the transparent display and the mask display. The delays may cause the image on the transparent display (usually the color image) and the mask image to be unsynchronized and unmatched or unaligned. To address this problem, one of the images can be delayed (either through different timelines of animation or playback or by storing and replaying frames at a delayed time) appropriately to regain synchronization between the transparent and mask images.

BRIEF DESCRIPTION OF THE DRAWINGS

FIG. 5 is a functional block diagram of a scrim with a dynamic LCD mask system (or 3D display assembly) showing a special purpose computer or controller adapted particularly with software or code to perform control functions for a dynamic mask element and a display element (such as projector or an OLED display).

DETAILED DESCRIPTION

Figure 1:
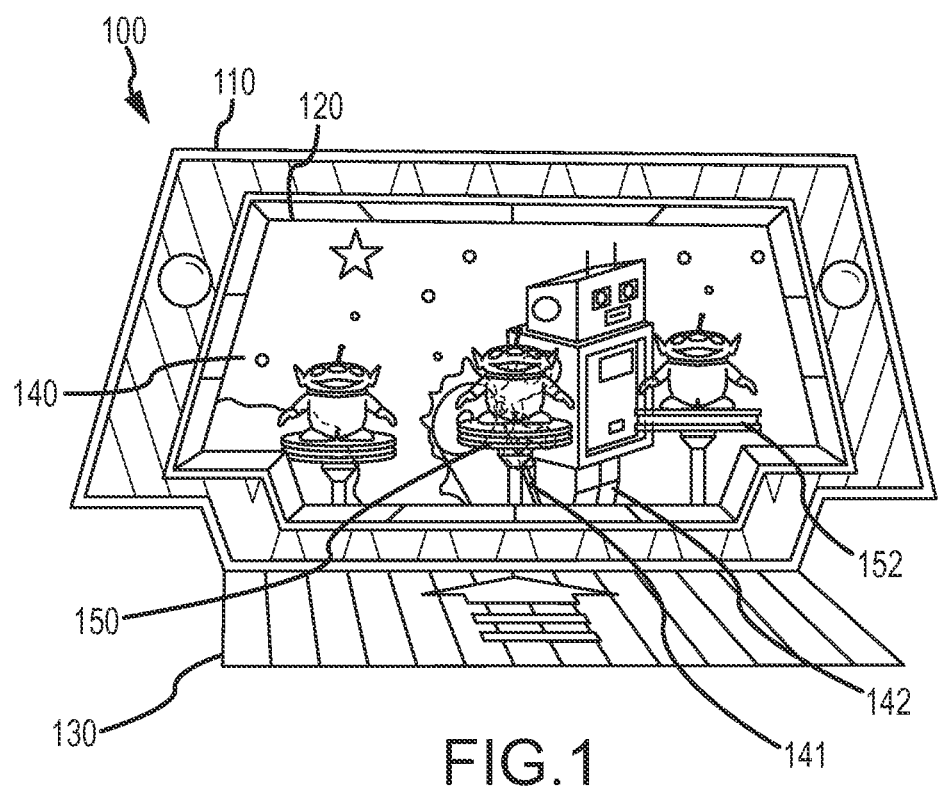
FIG. 1 is a prior 3D display adapted for projecting onto a scrim that is positioned within a physical set or scene.

Briefly, the following description presents a 3D display assembly or scrim with a dynamic LCD mask system that includes a scrim positioned between a background space and a foreground space, with physical surfaces and props provided in these two spaces (i.e., background and foreground sets filled with projection surfaces and/or physical props or objects). A projector (or multiple projectors) is provided to project virtual characters or objects upon the front surface of the scrim from the foreground space, while background light sources (which may include projectors, monitors, and the like) are used to light portions of the background set so that portions are visible through the scrim by viewers viewing the 3D display assembly from or through the foreground space.

A dynamic mask element, such as a transparent LCD panel, is positioned near or in contact with the back surface of the scrim in the background space. A controller operates the dynamic mask element to provide a dynamic mask with portions having the size and shape of the displayed virtual characters/objects and being positioned between the scrim and the background set elements (adjacent to or immediately behind displayed virtual characters on the scrim). The dynamic elements are typically opaque (black) while unmasked portions of the dynamic mask element are transparent. The dynamic elements can also be controllably semi-transparent.

In some embodiments, the scrim with a dynamic LCD mask system uses a combination of an LCD panel-provided dynamic mask, a scrim, and a projector. Compared to display devices using only a projector and a scrim, the described system creates virtual characters that are opaque and high contrast and also are able to cast real shadows. These advantages allow for more visually stunning and interesting projected characters and a brightly lit, more detailed, and populated background than those provided with traditional scrim projection (e.g., as the background does not have to be dark or dimly lit behind the scrim-displayed characters/objects). Ultimately, this allows for greater creative freedom in the design and implementation of virtual characters/objects, animation, and physical backgrounds with scrim projection.

The transparent display with a dynamic mask system described herein may be considered a special screen or display that is spatially selective in its absorption, transparency, and emissivity. No existing single display or screen exhibits control of all three of these properties as does the transparent display with a dynamic mask system. Differing embodiments of this system may be provided by combining a spatially selective absorptive/transparent display with a spatially selective emissive/transparent display (or a selectively scattering/transparent display or scrim). Examples of a selectively absorptive/transparent display include an LCD panel (e.g., an absorptive liquid crystal display similar to those used in a computer monitor with the backlight removed or a scattering liquid crystal display similar to those used for privacy screens and smart windows) and an electrowetting display. Examples of a selectively scattering/transparent or emissive/transparent display include a scrim (open weave cloth, light diffusers, scattering particle embedded plastics, polarization selective scattering films, birefringent polymer dispersed liquid crystal displays or display elements, and the like) plus a projector(s), a switchable transparent/scattering liquid crystal screen plus a projector(s), a transparent OLED display, a transparent backlight LCD, and a fluorescent electrowetting display. In this description, LCD panels are shown for use as a dynamic mask element (or a selectively absorptive/transparent display) in part because they can be quite large in size (e.g., 90-inch LCD panels are commercially available with 110-inch panels presently being prototyped) and are likely to be available in even larger sizes.

Figure 2:
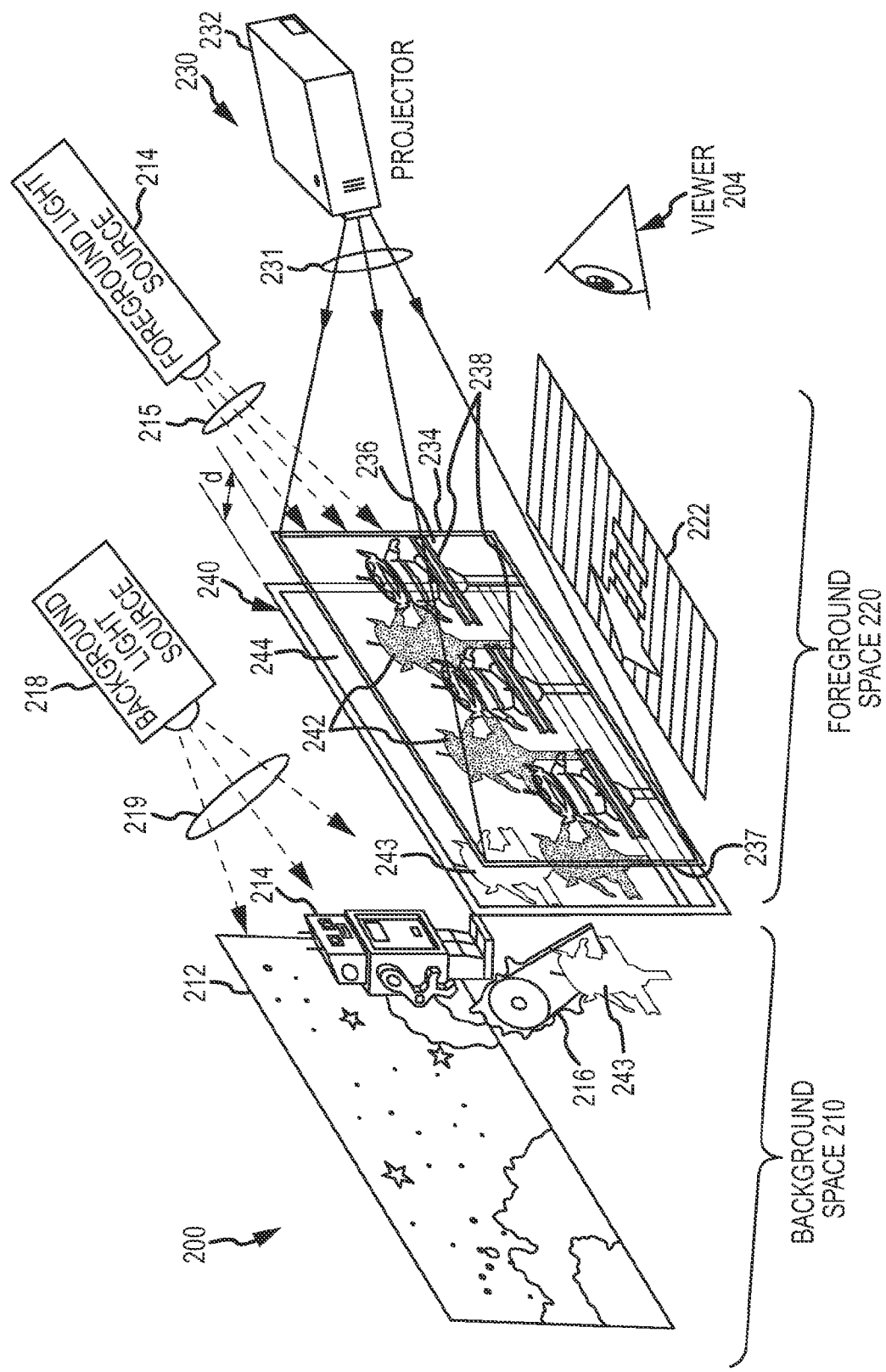
FIG. 2 is a schematic perspective view of a 3D display assembly (or transparent display with a dynamic mask or a scrim with a dynamic LCD mask system) during operation to provide a volumetric or 3D display to a viewer or audience.

FIG. 2 illustrates a partial perspective view of a scrim with a dynamic LCD mask system 200 of one embodiment. As shown, a 3D display or illusion is provided to a viewer 204 who views the system 200 within or from a foreground space 220. The system 200 includes a background space 210, and the background and foreground spaces 210, 220 may be used for providing physical props and display surfaces. In the background space 210 of FIG. 2, the system 200 includes a backdrop or background projection surface 212, which is shown to include some fixed artwork but it could also include animated or changing displays. The background space 210 also includes physical (or 3D) background props or objects 214, 216 that are positioned a distance apart from the backdrop and more proximate to the foreground space 220. Together, the backdrop 212 and background props 214, 216 define a background set or scene, and a background light source 218 is provided in the background space 210 to produce light 219 to illuminate the backdrop 212 and/or the props 214, 216 such that these components can be viewed by the viewer 204 via the foreground space 220 (e.g., via transparent or unmasked portions/areas 244 of a dynamic mask element 240 and a scrim 234).

The foreground space 220 is further used to provide depth and thematic features to the system 200. The foreground space 220 may include foreground props/surfaces 222 that are spaced apart from the background space 210 and closer to the viewer 204. In some embodiments, the viewer 204 may be located within the foreground space 220. The foreground space 220 typically will include one or more light sources 214, such as luminaries, lights within a room through which the viewer 204 passes, environmental lighting, and the like, and the light sources 214 produce or provide light 215 that illuminates the foreground props/surfaces 222. Additionally, as explained below, a portion of the foreground light 215 passes through the scrim 234 and dynamic mask element 240.

The scrim with a dynamic LCD mask system 200 further includes a display 230 that is operable to be selectively scattering or transparent (or to be selectively emissive or transparent). In the illustrated case, the display 230 includes a projector 232 and a scrim 234 with a front surface 236 facing into the foreground space 220 and toward viewer 204 and a back surface 237 facing into the background space 210 and away from the viewer 204.

The projector 232 is operable to project a light stream 231 to provide displayed or projected characters, objects, or images 238 at various positions or locations on the front surface 236 for viewing by the viewer 204 (e.g., a portion of the light 231 is scattered by the material of the scrim 234 back to the viewer 204). The scrim 234 may be a sheet or thickness of a material with an open weave such that it appears transparent to light 219 from the background. The scrim 234 is positioned to hang or be displayed between the background space 210 and the foreground space 220 (e.g., a planar sheet arranged orthogonally or to be perpendicular to a base plane).

The displayed characters 238 may include a variety of colors and be still images or be moving or animated characters moving to differing locations on the scrim 234 and/or changing in shape and/or size during operation of the projector 232. Numerous projectors may be used for projector 232 such as, but not limited to, a high illumination (1500 to 2000 or more lumens) and/or high definition (720 to 1080p or higher ratings) video projector (e.g., a "DLP LightCommander" distributed by Logic PD, Inc. or the like). With this positioning of the scrim 234, the displayed characters/images 238 are concurrently viewable by the viewer 204 with the foreground props/surfaces 222, the backdrop 212, and the background props 214, 216, which provides a display with depth or a 3D display.

Significantly, the scrim with a dynamic LCD mask system 200 further includes a dynamic mask element 240 between the scrim's back surface 237 and the background space 210. The dynamic mask element 240 may take the form of a transparent LCD panel, with its front or a first panel surface spaced a distance, d, from the back surface 237 of the scrim 234 to provide a compact system 200. In some cases, the distance, d, may be zero or near to it with the LCD panel in contact with back surface 237 of the scrim 234.

The mask element 240 is operated, as shown, to provide a dynamic mask (or masks) 242 and also to concurrently provide one or more unmasked or transparent areas 244. The masks 242 are "dynamic" in that they may change over time so as to change location, shape, and/or size to match the displayed/projected images 238 on the scrim 234. The masks 242 may also be dynamic in that they may range from semi-transparent to opaque to absorb a portion or fraction or all (or nearly all) of the light 215, 231 passing through the scrim 234. During operation, the displayed images 238 may be moved from one location on the scrim 234 to another or second location (or may change in shape and/or size), and the mask 242 would also be dynamically updated in location (and/or in shape and/or size) to be mapped to or match the location on the mask element 240 (e.g., move with the images 234 on the LCD panel). Concurrently, the unmasked areas or portions 244 would be changed by control or operation of the dynamic mask element 240 (e.g., a transparent LCD panel) to allow light to selectively pass through scrim in either direction (from the background 210 as scattered/reflected light 219 or from the foreground 220 as light 215 from source 214). The masks may also be dynamic in that they may be translucently or semi-transparently colored to provide a selective color cast over portions of the background light 219 being viewed by viewer 204.

In operation, the masks 242, when opaque as shown, act to block the light 231 from passing through scrim 234 and into the background space 210. In some embodiments, a portion of the mask 242 may be transparent or semi-transparent such as to match a portion of the displayed object/character 238 that is clear or semi-transparent such as a visor of a helmet or a glass portion of an object. Such portions of the mask 242 used to transmit some light may be grey to provide semi-transparency or white to allow fuller transparency to the background space 210.

When opaque (or black), the mask 242 is effective in blocking light 231 from transmitting into the background space 210 to avoid problems with double imaging or blow-by. The mask 242 is also effective in blocking light 219 from the background light source 218 from being transmitted through the images/characters 238 into the foreground space 220, which prevents a viewer 204 from viewing the backdrop 212 and props 214, 216 through the characters/images 238 to provide a solid and sharp character/image 238 rather than one that is semi-transparent as was the case with prior scrim-based 3D displays.

As shown and discussed, the mask 242 may be black to block light from passing through the scrim 234 to the background space 210 at the locations of the displayed/projected characters/images 238. As discussed with prior scrim-based projections, blow-by or projector spill would pass into the background space 210 if it were not for the dynamic mask 242 provided by dynamic mask element 240. Further, though, the use of opaque or black mask 242 causes shadows 243 to be cast into the background space 210 when light 215 from a foreground light source 214 (ambient light or light from sources provided in system 200) strikes scrim 234. This light is passed through the transparent or unmasked portions 244 but is blocked by the masked portions or dynamic mask 242, which results in shadows 243 being cast into the background space 210 as if the virtual characters/objects 238 were physical or solid objects and not merely projected imagery provide on an otherwise transparent screen. No prior scrim-based projection assemblies have been able to provide characters/objects that cast shadows at all let alone in an accurate manner (mask 242 is shaped and sized as well as mapped in location to the displayed characters/images 238 so as to be provided immediately behind the characters/images 238 when the display system 200 is viewed by the viewer 204).

Figure 3:
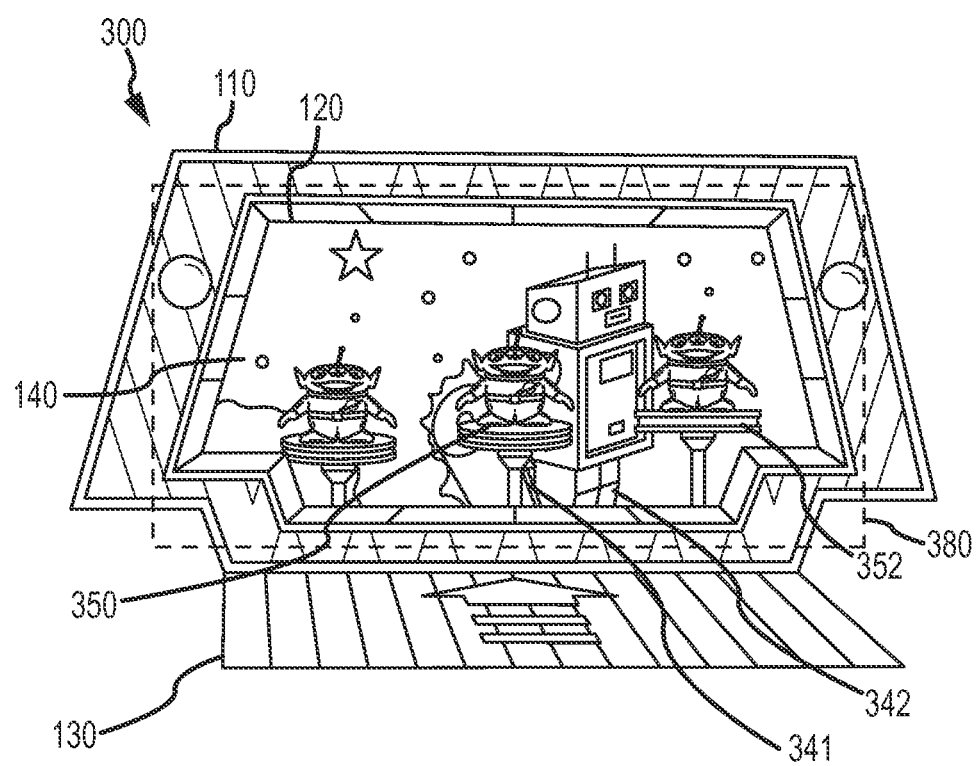
FIG. 3 is a 3D display assembly similar to that of FIG. 1 except that it is modified according to the present description to include a dynamic mask element positioned behind the scrim (between the scrim and lit background components)

FIG. 3 is useful for illustrating the significant improvements in display results or 3D illusions achieved with the present invention. As shown, a 3D display assembly 300 is provided that includes several of the same components as included in the assembly 100 of FIG. 1. Particularly, these shared components include a physical frame or set 110 that may be used to support and enclose (or shape a boundary of) a scrim 120 (or an emissive/transparent element when an OLED is used rather than a scrim and projector combination such that 120 may be considered a scattering/transparent display or an emissive/transparent display (or more generally both of these may be called or labeled a "display element" that selectively displays images or is transmissive to light in differing portions/areas of its surface)).

The shared components also include a foreground platform or foreground prop 130 that extends outward toward a viewer, i.e., outward from the frame 110 into a viewer or foreground space. Also, the system 300 includes a backdrop or background set (e.g., a display or projection or monitor surface) 140 as well as physical or real world background objects or props 341, 342 positioned behind the scrim 120, but in front of the backdrop 140, for viewing when lit through the scrim 120 by a viewer or audience member. In use, as shown, the backdrop 140 and background props 341, 342 are lit or illuminated by a background light source (such as the source 218 shown in FIG. 2) such that light reflected off of their surfaces can be selectively transmitted through the scrim 120.

In contrast to the system 100 of FIG. 1, the system 300 of FIG. 3 includes a dynamic mask element 380 that is positioned between the scrim 120 and the background props 341, 342. For example, the dynamic mask element 380 may take the form of an LCD panel that is controlled to be selectively transparent in unmasked areas or portions and to be opaque (or at least only semi-transparent, e.g., gray) in masked portions or areas or in areas/portions used to provide the dynamic mask of the present invention. The LCD panel or dynamic mask element 380 may be placed in contact with the back surface of the scrim or display element 120 to provide a more compact 3D display system 300.

While not visible in FIG. 3, the dynamic mask element 380 is being operated dynamically to provide a mask as discussed with regard to FIG. 2. Particularly, the display element 120 is being used during the illustrated operation of the system 300 to display images (characters in this case but may be an object, too) 350, 352. The virtual images 350, 352 appear to be positioned "physically" between the foreground prop 130 and the background backdrop 140 and props 341, 342.

In contrast to FIG. 1, the displayed images 350, 352 are solid and not translucent to light. This is achieved by operating the dynamic mask element 380 to provide opaque (black) masks with a shape and a size that match the images 350, 352 and also that are mapped in location so as to be directly behind and adjacent to the displayed images 350, 352 with the mask element 380 placed proximate to the display element 120.

In this way, light from the background space that is reflected or scattered from the props 341, 342 and backdrop 140 is blocked by the mask element 380 by the dynamic mask so that these background components are not visible through the virtual characters or images 350, 352 (which appear solid and to have high contrast). Also, any light used to create the images 350, 352 (such as from a projector) is blocked by the dynamic mask such that there is no blow-by or double imaging problems on the props 341, 342 or backdrop 140. The mask is dynamic in that when the images 350, 352 are changed in shape, position, and/or location the mask element 380 is concurrently controlled to update or change the mask it provides to match the shape, position, and location of the images 350, 352 on display element 120.

Figure 4:
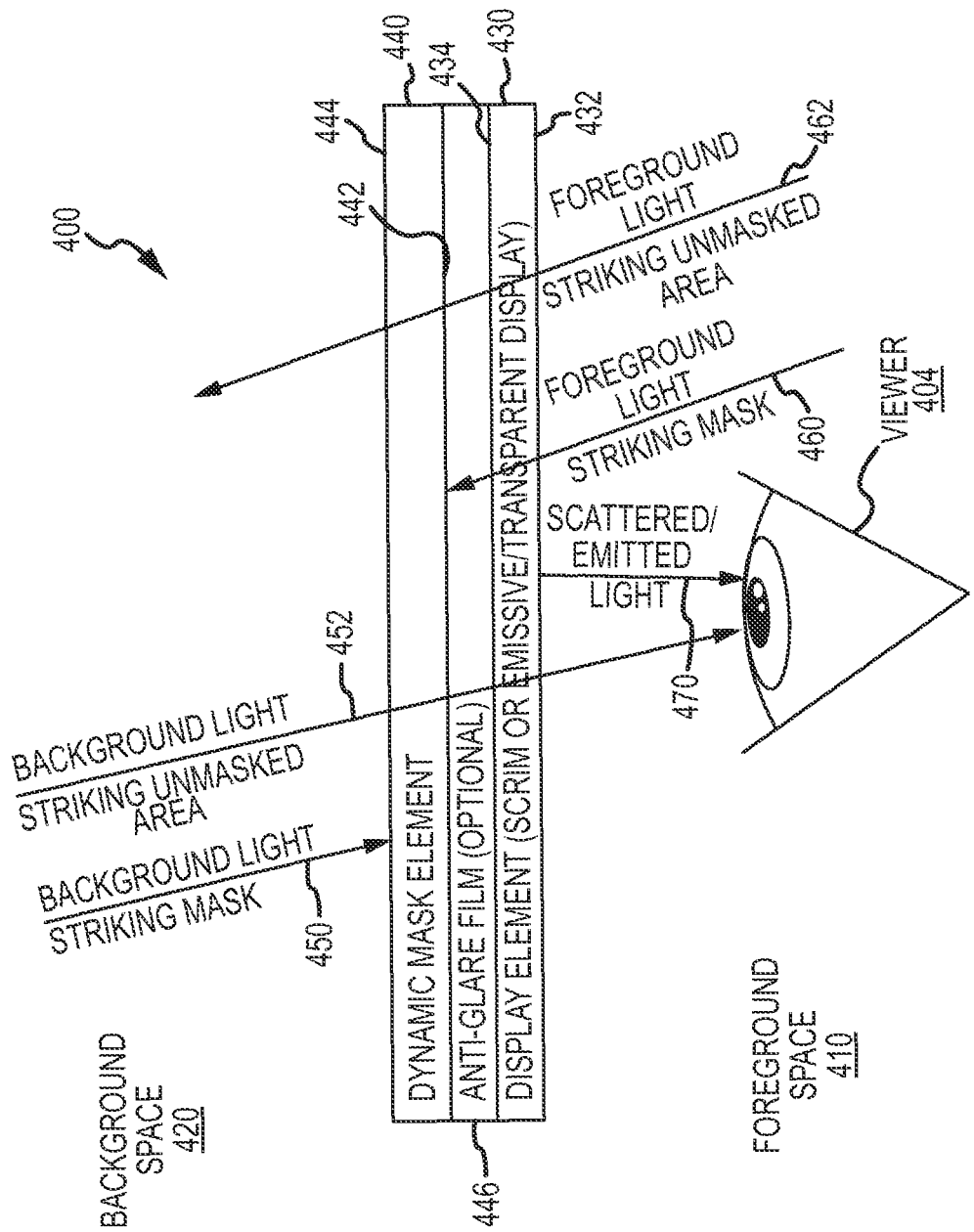
FIG. 4 is a top view of a portion of a scrim with a dynamic LCD mask system of the present description illustrating light paths during operation of the system to provide a 3D or volumetric display to an audience.

FIG. 4 illustrates a schematic top view of a scrim with a dynamic LCD mask system 400 during operation to provide volumetric imagery to a viewer 404. The system 400 has a foreground space 410 where the viewer 404 may be positioned or may view the system 400 through this space 410 and in which foreground props such as physical objects may be positioned to provide visual and/or depth reference points to the viewer 404 and thematic elements to the scene. The system 400 also includes a background space 420 further away from the viewer 404 where backdrops and background props may be positioned. Further, background light sources may be provided in this background space to light these background components to allow viewing by (or illuminate them to) the viewer 404.

Significantly, the system 400 includes an assembly of a display element 430 and a dynamic mask element 440 that are positioned between the foreground and background spaces 410 and 420 (or at least between the viewer 404 and the background space 420). Both may be planar components that are abutted together as shown and arranged to be perpendicular to the horizontal (but this latter aspect is not a requirement and other angular arrangements may be useful in some applications).

The display element 430 may take the form of a scrim such that it can be illuminated selectively by a projector in the foreground space 410 and also pass light originating in the background space 420. In other cases, the display element 430 may be an emissive/transparent display such as an OLED display. In either case, the display element produces light 470 that is transmitted to the viewer 404 to allow one or more images such as characters or objects (still or animated) to be viewed during operation of the system 400. As shown, the display element 430 includes a front or first surface/side 432 facing or exposed to the foreground space 410 and proximate to the viewer 404 and a back or second surface/side 434 (opposite the front/first side 432) facing toward the background space 420 and away from the viewer 404.

The dynamic mask element 440, e.g., an LCD panel or the like that may be controlled to be selectively transmissive, opaque, or semi-transparent to light, is positioned to be parallel to the display element and between the background space 420 and the display element 430. The dynamic mask element 440 includes a first or front surface/side 442 that is adjacent to and typically contacting (or at least proximate to) the back side 434 of the display element 430.

In some embodiments, it is desirable to provide a treatment or a film of material 446 on or over the first side 442 to adjust/control the optical qualities of the mask element 440. For example, the film 446 may include an anti-glare film such as an anti-scratch film (e.g., films available from 3 M or other distributors such as a film distributed under the mark or trade name of invisibleSHIELD™ by ZAGG, Inc. or the like) that enhances the transparency or makes the appearance less foggy/diffused (makes the element 440 more transparent in the case of many transparent LCD panels)). The dynamic mask element 440 further includes a second or back surface/side 444 (opposite the first side 442) that faces toward the background space 420 and away from the viewer 404. In some embodiments, it is desirable to add a polarization retarder film, when a polarized display (e.g., a LCD) is used in the backdrop. The polarization retarder film aligns the polarization of the backdrop's polarized display with the dynamic LCD mask, so that the backdrop polarized display's image may pass unattenuated through the dynamic LCD mask's transparent areas.

During use, the display element 430 is used, such as with operation of a projector when the element 430 includes a scrim or by controlled emission/transparency when the element includes a transparent OLED display, to selectively display images and light 470 is directed outward into the foreground space 410 to the viewer 404. Concurrently, a dynamic mask is created in the mask element 440 as discussed with reference to FIGS. 2 and 3, and the mask is dynamically mapped in position and size/shape to the displayed images on the display element.

As a result, in addition to image light 470, the viewer 404 concurrently views or receives background light 452 that strikes unmasked areas of the dynamic mask element 440 (e.g., its transparent areas or portions not associated with a displayed image on the display element 430). This light 452 may be from sources positioned in the background space 420 and/or may be reflections of foreground light 462 that also strikes unmasked areas of the display element 440, as other portions of such light from the foreground are blocked/absorbed by the dynamic mask so as to cast shadows.

As shown, background light 450 that strikes the dynamic mask element 440 at the locations of dynamic masks (e.g., a black portion of an LCD panel) is blocked such that it does not travel through the display element 430 and its displayed images. In this way, the displayed images appear solid and high contrast to the viewer 404. Also, foreground light 460 that passes through the display element 430 via the displayed images are blocked by the dynamic mask of the mask element 440, as the mask is provided directly behind (or adjacent to) the displayed character according to the present description. In this way, the foreground light 460, which may include projector light in the case where display element 430 is a scrim, does not reach the background space 420 to avoid problems with blow-by and/or double imaging of the displayed images (e.g., no characters shown on background props or backdrops).

FIG. 5 illustrates a functional block diagram of a transparent display with a dynamic LCD mask system or 3D display assembly 500 of an embodiment of the present description. As shown, the system 500 includes a controller (e.g., a special purpose computer) 510 with one or more processors (or CPUs or GPUs) 512 for running code or software to perform display functions described herein and for managing memory 520 (which may be on the computer/controller 510 or accessible wirelessly or via a wired connection via a digital communication network). The CPU 512 further operates to manage operation and processing signals from I/O devices 514 such as a mouse, keyboard, touch screen, touch pad, monitor, printer, and the like so as to allow an operator to provide input such as to select an image stream 522 to display on a display element 560 and/or to control operation of a mask generator 530 and/or mask synchronizer 536.

As discussed above for systems 200 and 400, the system 500 includes a display element 560 for selectively outputting a displayed image that can be viewed by an audience member or viewer of the system 500. The display element 560 may include a transparent OLED display, and the controller 510 may operate to process a display image stream 522 in memory 520 to provide a control signal 550 to cause the transparent OLED display 560 to be selectively emissive and transparent to provide a displayed image 564 at a particular location(s) with a particular shape and size (and colors). In other cases, the display element 560 may be formed with one or more scrims and one or more projectors, and the control signal 550 (color channel) may cause a projector to project light onto the scrim to provide the displayed image 564 (again, at a particular location(s) with a particular shape and size (and colors)).

The system 500 further includes a dynamic mask element 580 selectively controlled by the controller 510 via control signals 570 to present a mask 584 in areas or portions of the mask element 580 that correspond with the location (and size/shape) of the displayed image 564 on the display element 560. To this end, the controller 510 includes or runs a mask generator 530 (e.g., a game engine or the like provided in computer-readable medium to cause the controller to perform particular mask generation functions). The mask generator 530 may be configured to process the display image stream 522 (e.g., a digital image or video file) and to output a color image stream (e.g., for projection on a scrim) for use in control signal 550 and a corresponding mask for use in providing control signal 570.

The mask 584 produced by the dynamic mask element 580 may be black to provide an opaque mask or may be gray to provide a semi-transparent aspect or a combination thereof (e.g., to provide opaque portions corresponding to an image that has solid features and to provide a translucent or even transparent portion corresponding to translucent to transparent portions of a displayed image as would be the case for features "made" of glass, plastic, or the like).

In some cases, the mask generator 530 further includes routines, such as homography programs, to cause the mask 584 to match possible distortions in the displayed image 564 (e.g., from projecting at an angle other than 90 degrees or the like). In other cases, though, the display element 560 will be controlled via signal to cause the projection to match the undistorted image or mask 584 shown on the mask element (e.g., the transparent LCD panel) 580. The mask 584 may also be color to provide a colored translucent/transparent material.

In some implementations of the system 500, the mask element 580 may have a delay in presenting a mask 584 relative to the display element 560. This may happen, for example, when the display element 560 is a projector and scrim combination and the mask element 580 is an LCD panel as these and other monitors may perform additional processing of the signal 570. So, to avoid the mask 584 being rendered at a later frame or subframe compared to the displayed image 564, a mask synchronizer 536 may be used to insert or provide a mask delay that can be used by the CPU 512 to add delay or lag to the control signal 550 to synchronize the output of the displayed image 564 with the mask 584.

In other words, the system 500 may be configured for compensating for frame delay between the transparent display and the mask. Often one or both of the transparent display and the mask display perform image processing on the input imagery. This can cause a time delay between input and display which may be different between the transparent display and the mask display. The delays may cause the image on the transparent display (usually the color image) and the mask image to be unsynchronized and unmatched or unaligned. To address this problem, one of the images can be delayed (either through different timelines of animation or playback or by storing and replaying frames at a delayed time) appropriately to regain synchronization between the transparent and mask images.

The mask generator 530 may also be adapted to account for props or objects that extend through the display element 560 between a background space and a foreground space. For example, a set piece (such as a log) may extend through a scrim 560, and it is desirable for the displayed image 564 to be shaped so as to not be displayed/projected upon this prop or set piece. To this end, a display-based mask 528 may be stored in memory 520 or be created by the mask generator 530 as part of processing of the display image stream 522. Then, the mask 528 may be provided in the control signal or color channel 550 used to operate the display element 560 (e.g., to block projection by a projector to avoid projecting onto the foreground object). In this manner, the displayed image 564 and other lighting smoothly projects upon both display element 560 as well as foreground surfaces.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. For example, the 3D displays may be used with still or moving props and object and may also be used in 3D displays with live action sets (e.g., plays, live action shows, and the like) to provide volumetric or 3D imagery. In the above description and following claims, the displays often were described as including scrims, but the displays may be implemented using a scrim or any other light scattering device or sheet.

In some embodiments, a transparent OLED display is used in place of the scrim and projector to provide the selectively scattering/transparent or emissive/transparent display element of the 3D display assemblies described herein. Transparent OLED displays are operated to either be transparent or emissive, and they do not selectively absorb light from the background. Therefore, transparent OLED displays exhibit the same limitations or challenges as a scrim and projector combination to provide the emissive/transparent display element. The combination of a large transparent OLED display with an LCD panel (or other dynamic mask element) may readily be used to provide a self-contained compact 3D display assembly without the need for a separate projector. This 3D display assembly likely would be brighter and more detailed than using a scrim with an LCD panel since the OLED display's pixel spacing is much denser than provided with a scrim's open weave.

In some cases, a system may include a polarization selective scattering film. This film would be used to scatter polarized projected light such as from display 230 (like from an LCD projector), but the film passes cross-polarized light (e.g., light 219) from the background (e.g., background space 210 and passing through transparent portions of the LCD mask 240). This film acts like a scrim in that it scatters the projected light and passes the background light, but, since it is a continuous film, it will not impart any additional texture on the projected image (e.g., visible to viewer 204 in FIG. 2).

I claim:

1. An apparatus for generating three dimensional (3D) or volumetric imagery, comprising:
    a display element that is transmissive to light and that is selectively operable to display an image at a first location on the display element; and
    a dynamic mask element that is transmissive to light that is positioned adjacent to the display element, the dynamic mask element being selectively operable to provide, concurrently with the operating of the display element to provide the displayed image, a mask with a shape and a size corresponding to the displayed image, wherein the mask is positioned on the dynamic mask element to be adjacent to the first location and wherein the mask includes portions that are clear or colored and are semi-transparent or opaque.

2. The apparatus of claim 1, further comprising a background space containing background props and a light source lighting the background props and further comprising a foreground space comprising foreground props, and wherein the display element and the dynamic mask element are positioned between the foreground and background spaces, the lighting of the background props being occluded from view in the foreground space by the mask.

3. The apparatus of claim 1, wherein the dynamic mask element comprises a transparent liquid crystal display (LCD) panel and wherein the mask portions that are colored are color, the mask portions that are semi-transparent are gray, and the mask portions that are opaque are black.

4. The apparatus of claim 1, wherein the display element comprises a scrim with a back surface contacting the dynamic mask element and a front surface opposite the back surface and further wherein the display element comprises a projector projecting light onto the front surface to provide the displayed image.

5. The apparatus of claim 1, wherein the display element comprises a transparent OLED display with a back surface proximate to the dynamic mask element, the transparent OLED display being operated to provide transparent portions and to concurrently provide color portions associated with the displayed image.

6. The apparatus of claim 1, wherein the display element is operable to display a second image at a second location on the display element and wherein, in response, the dynamic mask element is concurrently operable with the display element to provide a second mask with a shape and a size corresponding to the displayed second image, the second mask being colored, semi-transparent, or opaque and being located adjacent to the second location on the dynamic mask element.

7. The apparatus of claim 1, wherein the mask includes portions that are transparent to semi-transparent and portions that are opaque, whereby light passing through the display element in an area associated with the displayed image is both transmitted through and blocked by the dynamic mask element.

8. A transparent display with a dynamic mask system, comprising:
 a background space assembly including a background prop and a light source illuminating the background prop;
 a scrim;
 a projector selectively projecting an image onto a front surface of the scrim opposite the background space assembly; and
 a mask element comprising a display panel with a surface proximate to a back surface of the scrim, the mask element providing a mask on the display panel at a location mapped to a location of the projected image, wherein the display panel is transparent in areas other than within the mask and is colored or clear and is semi-transparent to opaque within the mask.

9. The system of claim 8, wherein the display panel of the mask element comprises a transparent LCD panel.

10. The system of claim 9, wherein the mask element further comprises a film of polarization retarder to accommodate polarized displays in the background space assembly.

11. The system of claim 8, further comprising a controller running a mask generator to process an image stream, used to operate the projector to project the image on the scrim, to generate the mask.

12. The system of claim 11, wherein the mask differs over time so as to match the location, a shape, and a size of the displayed image.

13. The system of claim 8, wherein a set piece extends out from the front surface of the scrim and wherein a display-based mask is used to mask a portion of the projected image to limit projection of light from the projector onto the set piece.

14. The system of claim 8, a foreground space assembly including a foreground prop and a light source illuminating the foreground prop and the front surface of the scrim, wherein the mask blocks at least a portion of light from the light source striking the front surface of the scrim to cast a shadow within the background space assembly.

15. An apparatus for use in a 3D display between a foreground space and a background space, comprising:
 a display element with a front surface and a back surface, the display element transmitting light and concurrently displaying an image via the front surface; and
 a dynamic mask element with a front surface proximate to the back surface of the display element, the dynamic mask element operating responsive to a control signal to generate a mask to block light in an area associated in location with the displayed image on the display element.

16. The apparatus of claim 15, wherein the dynamic mask element is transparent to light except in the area corresponding to the mask.

17. The apparatus of claim 16, wherein the dynamic mask element comprises a transparent LCD panel and wherein the mask is colored, gray, or black.

18. The apparatus of claim 15, wherein the display element comprises a light scattering sheet.

19. The apparatus of claim 18, wherein the light scattering sheet comprises a polarization selective scattering film.

20. The apparatus of claim 18, wherein the light scattering sheet comprises a birefringent polymer dispersed liquid crystal display element.

21. The apparatus of claim 15, wherein the display element comprises a self-emissive display.

22. The apparatus of claim 21, wherein the self-emissive display comprises at least one of a transparent OLED display, a display providing a laser projection on a phosphor screen, and a fluorescent electrowetting display.

23. The apparatus of claim 15, wherein the control signal varies over time whereby the mask is modified over time to change in at least one of location, size, and shape to correspond with movements and changes of the displayed image on the display element.

* * * * *